United States Patent
Weston

(10) Patent No.: US 6,626,284 B2
(45) Date of Patent: Sep. 30, 2003

(54) CONVEYOR/ELEVATOR WEB

(76) Inventor: David Booth Weston, Will O'Wisp Marshroad, Kirton Boston, Lincs (GB)

(*) Notice: Subject to any disclaimer, the term of this patent is extended or adjusted under 35 U.S.C. 154(b) by 0 days.

(21) Appl. No.: 09/898,788

(22) Filed: Jul. 3, 2001

(65) Prior Publication Data

US 2002/0046926 A1 Apr. 25, 2002

(30) Foreign Application Priority Data

Jul. 4, 2000 (GB) .............................. 0016293

(51) Int. Cl.[7] .............................................. B65G 13/02
(52) U.S. Cl. ...................................... 198/692; 198/820
(58) Field of Search .............................. 198/692, 699.1, 198/820

(56) References Cited

U.S. PATENT DOCUMENTS

| 712,020 | A | * | 10/1902 | Tinsley | 198/692 |
| 1,346,650 | A | * | 7/1920 | Hendrickson | 198/699.1 |
| 1,718,150 | A | * | 6/1929 | Hurxthal et al. | 198/692 |
| 1,762,473 | A | * | 6/1930 | Hancock | 198/692 |
| 1,962,980 | A | * | 6/1934 | Buckner | 198/692 |
| 2,847,112 | A | * | 8/1958 | Black et al. | 198/550.12 |
| 3,262,549 | A | * | 7/1966 | Stewart et al. | 198/692 |
| 3,321,066 | A | * | 5/1967 | Christianson | 198/692 |
| 3,679,050 | A | * | 7/1972 | Anderson et al. | 171/126 |
| 4,718,541 | A | * | 1/1988 | Wilding | 198/699.1 |

* cited by examiner

Primary Examiner—Christopher P. Ellis
Assistant Examiner—Richard Ridley
(74) Attorney, Agent, or Firm—R W Becker & Associates; R W Becker

(57) ABSTRACT

A conveyor/elevator web is provided and comprises transverse bars attached to rubber traction belts, wherein the transverse bars have a plurality of spaced outwardly extending fingers or projections in order to provide a means of attachment of either a flexible conveyor sheet and/or of the above rubber traction belts. Also at least some of the outwardly extending fingers or projections of the transverse bars provide a means of entrainment of the crop or material being conveyed/elevated.

8 Claims, 5 Drawing Sheets

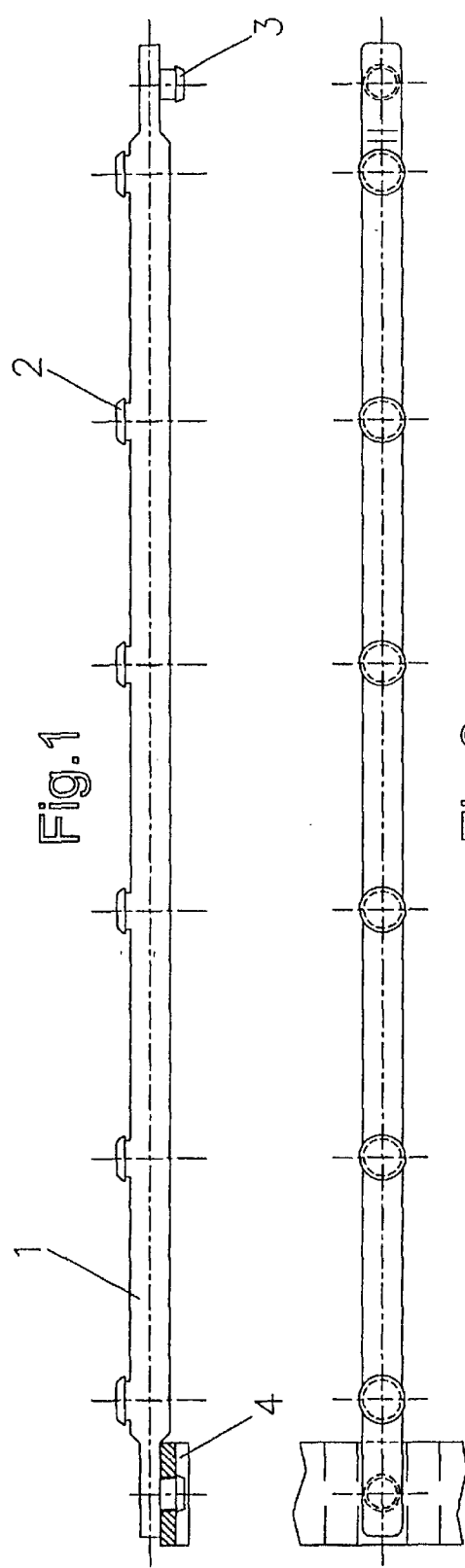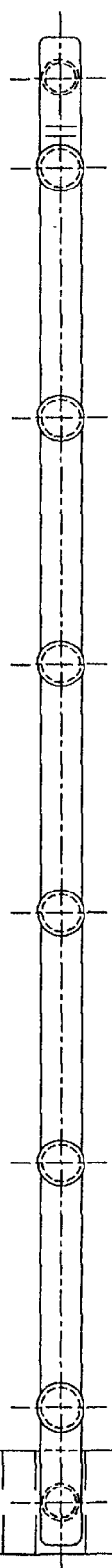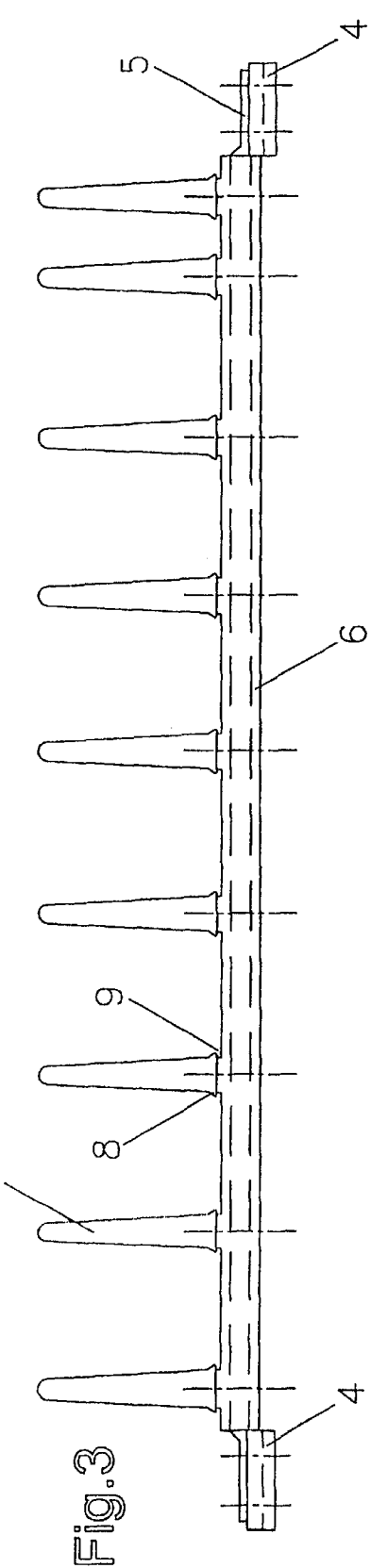

CONVEYOR/ELEVATOR WEB

BACKGROUND OF THE INVENTION

The present invention relates to a conveyor/elevator web, particularly, but not exclusively, for use in a vegetable, root crop or bulb harvester.

Conveyor and elevator webs are commonly used in agriculture, particularly in root crop harvesting machines. Webs are constructed by attaching a series of transverse bars to rubber traction belting to form a conveyor belt. In order to elevate the crop being harvested, various forms of spaced flight are connected to some of the web conveyors transverse bars.

The traditional method of attaching transverse bars to rubber traction belts using metal rivets is a time consuming and technically difficult operation and therefore expensive.

The elevator web bars which provide the conveyor surface between flights can be replaced by a flexible plastic sheet, in order to provide a lighter construction with less components, a less damaging surface for the crop and a surface that is self cleaning of soil.

However the flights of the above known, sheeted elevator web constitute a large proportion of the weight of construction; also they obstruct the flow of material onto the conveyor surface and therefore reduce its potential capacity.

BRIEF SUMMARY OF THE INVENTION

An object of the present invention is to provide an elevator web in which the above mentioned disadvantages are at least alleviated.

The incorporation of transverse web bars in accordance with the invention into the construction of a conveyor/elevator web provides increased support for the flexible sheet and improved means of attachment of the flexible sheet and/or the rubber traction belts.

In order to construct a conveyor web of the invention the transverse bar projections need only be sufficiently long to form button shaped or flanged pegs to locate and retain the conveyor sheet and/or the rubber traction belts.

Alternatively, in order to construct an elevator web of the invention at least some of the transverse bar projections would extend above the conveyor surface to the required height of the surface of the material being elevated to form entraining fingers.

Preferably, the transverse bars consist of a resiliently deformable material, typically rubber or polyurethane, molded onto a rigid bar or tube formed of metal or plastics material.

Alternatively, the transverse bars could be formed of metal or a rigid plastics material.

Preferably, where either the transverse bar projections or the web components being attached to the transverse bar projections, i.e. rubber traction belts, are resiliently deformable the means of attachment of the assembled components would be provided by the shape of the projections.

Alternatively, an additional fastening device, i.e. clip or retaining washer, could be used in conjunction with the transverse bar projections to provide means of attachment.

Further fingers or projections may be provided towards each end of the transverse bars to form retaining sides of the conveyor/elevator web.

Additional components may be attached to the rubber traction belts between the transverse bars to form retaining sides of the conveyor/elevator web.

Preferably, the transverse bars in conjunction with the flexible conveyor sheet form pockets in the surface of the conveyor/elevator web to assist the entraining fingers.

Preferably, the flexible conveyor sheet would overlap so that both ends of a full-length sheet would be fitted to and retained by the corresponding fingers or projections of the same transverse bar.

Alternatively, the flexible sheet may be formed by a series of short sections with the trailing end of each section overlapping the leading end of the next section.

BRIEF DESCRIPTION OF THE DRAWINGS

An embodiment of the invention will now be described with reference to the accompanying schematic drawings, wherein:

FIG. 1 shows in side view a transverse bar of a conveyor web in accordance with the present invention, FIG. 2 shows in plan view the transverse bar of FIG. 1, FIG. 3 shows in side view a transverse bar of an elevator web in accordance with the present invention.

DETAILED DESCRIPTION OF THE PREFERRED EMBODIMENTS

Figure 4:
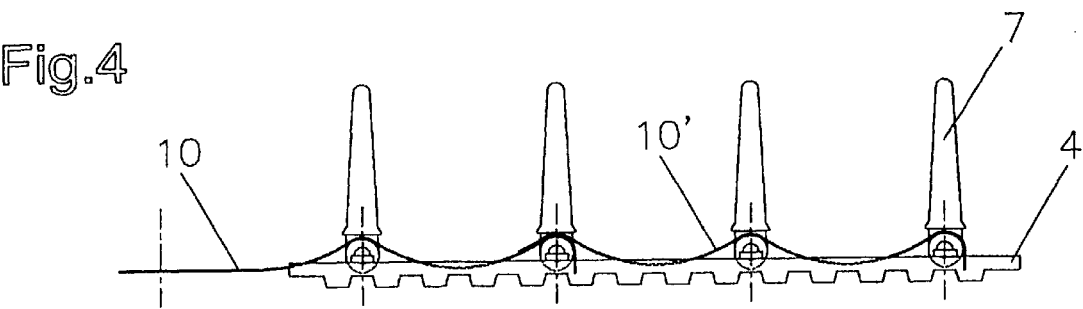
FIG. 4 shows in side view part of an elevator web in accordance with the present invention.

In FIGS. 1 and 2 a conveyor web transverse bar 1 has a plurality of upper flanged projections 2 to facilitate attachment of a conveyor sheet; further projections 3 below both ends facilitate attachment to rubber traction belts 4.

In FIG. 3 a web bar 5 has a molded covering 6 with a plurality of outwardly extending fingers 7. At both ends the web bar 5 is attached by traditional means to traction belts 4.

Figure 6:
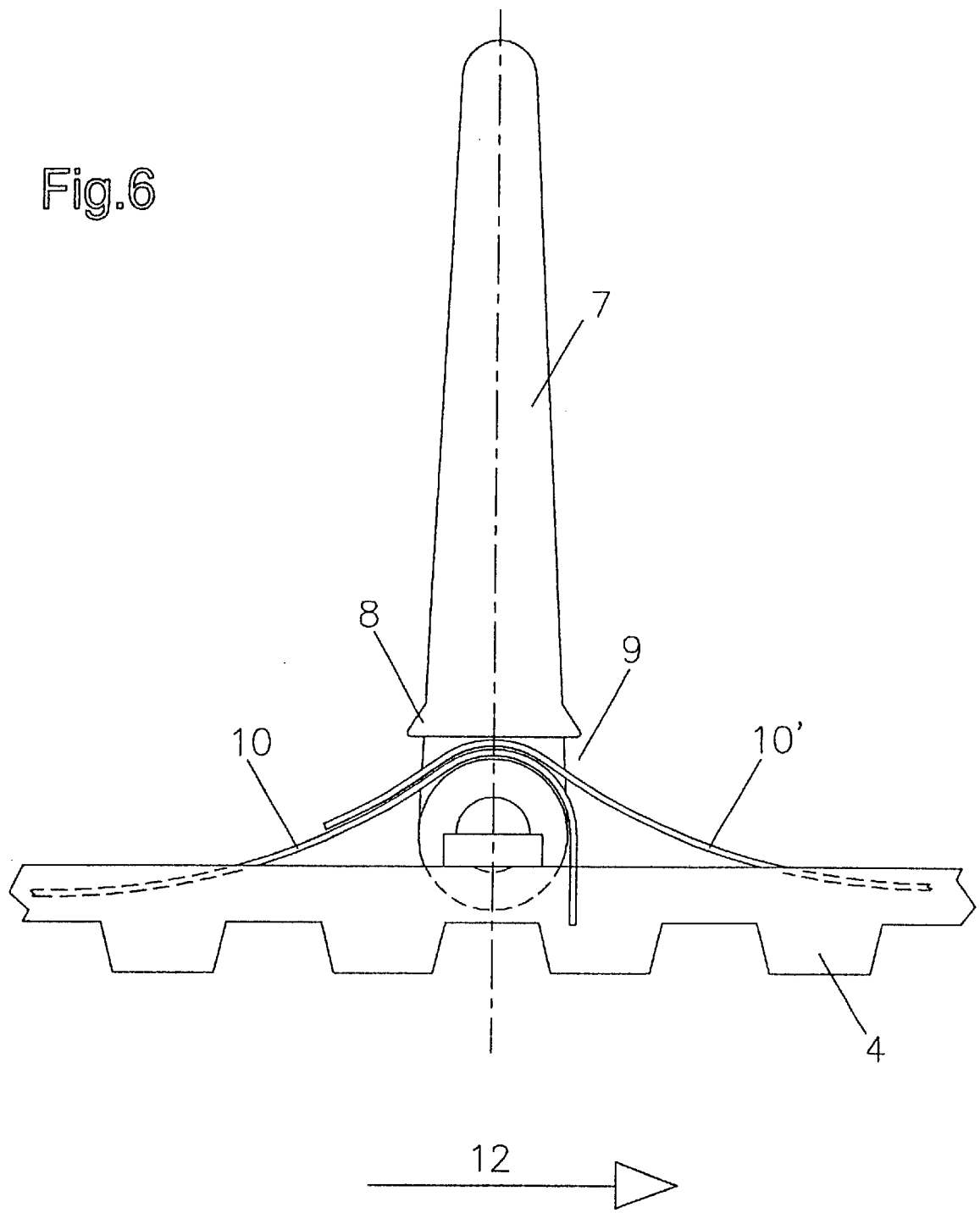
FIG. 6 shows in end view one of the transverse bars of FIG. 4.

The transverse bar, or elevator web finger bar, shown in FIG. 3 differs from known elevator web finger bars in one respect only, i.e. the fingers 7 have a flange 8 forming a recess 9 at their base, also shown in larger scale in FIG. 6, in order to provide means of attachment of a conveyor sheet.

Figure 5:
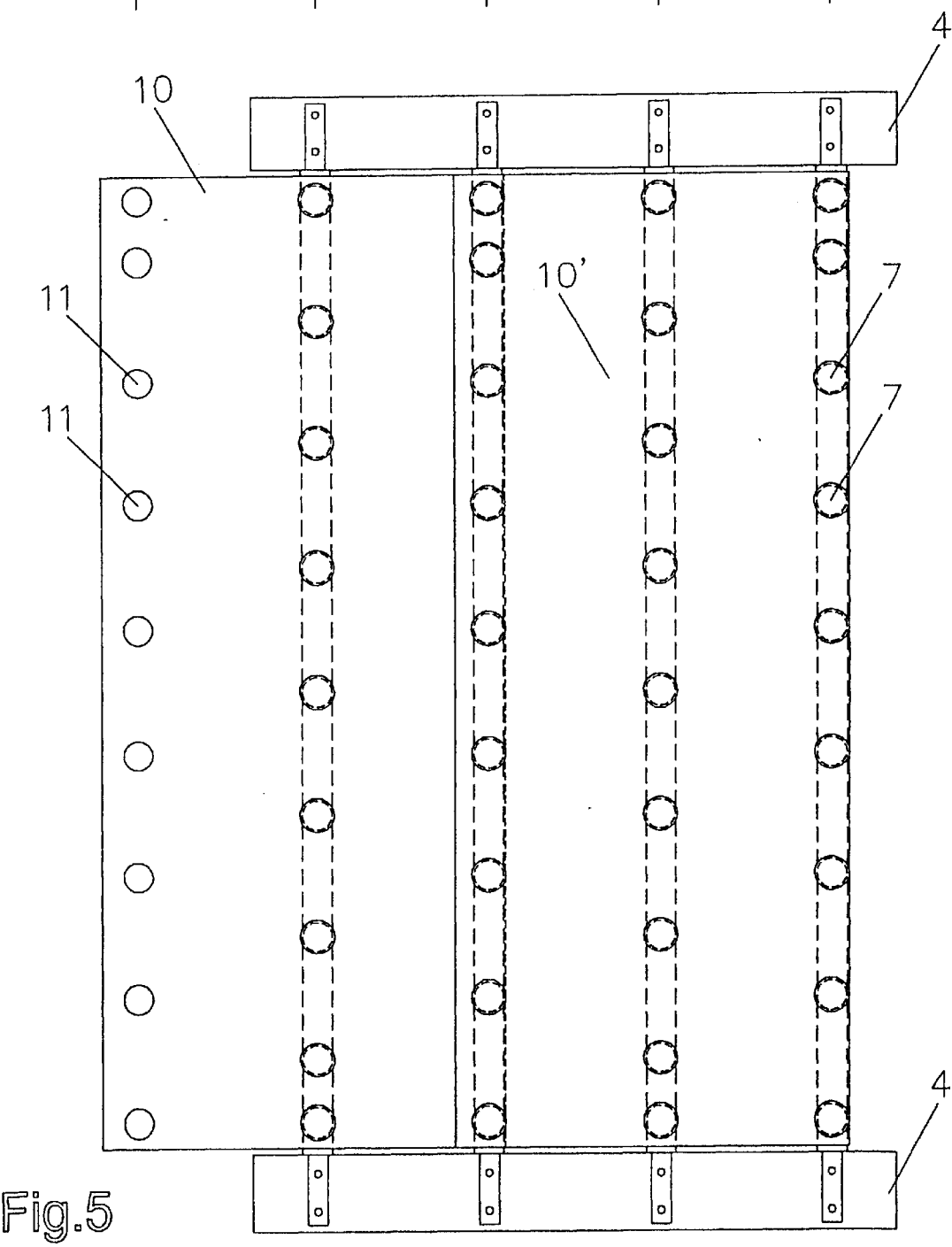
FIG. 5 shows in plan view part of an elevator web of FIG. 4.

In FIGS. 4 and 5 short sections of conveyor sheet 10 and 10' are shown fitted to a plurality of transverse bars of FIG. 3, attached to traction belts 4.

The spacing of the fingers 7 along the transverse bars of FIG. 3, combined with the spacing of the above transverse bars along the traction belts 4, shown in FIGS. 4 and 5, provide a diamond shaped pattern of entraining fingers 7 over the conveying surface in order to support material being elevated by an inclined conveyor.

The holes 11 provided in the conveyor sheets 10, 10' shown in FIGS. 4 and 5 are positioned to correspond with the fingers 7 of the transverse bars of FIG. 3, or alternatively with the flanged projections 2 of the transverse bar 1 of FIGS. 1 and 2. The holes 11 are of a smaller diameter than the outer diameter of the flange 8 of the fingers 7, so that once fitted by forcibly passing the resiliently deformable flanges 8 through the holes 11, the conveyor sheet 10 becomes attached to the transverse bars of FIG. 3. The holes 11 are also positioned along the above conveyor sheets 10, 10' in order to provide sufficient slack material between transverse bars to create pockets in the conveyor surface.

In FIG. 6 the direction of travel, indicated by the arrow 12, of the conveyor/elevator web is shown in relation to the arrangement of the leading end of conveyor sheet 10 being positioned beneath the trailing end of conveyor sheet 10'.

Figure 7:
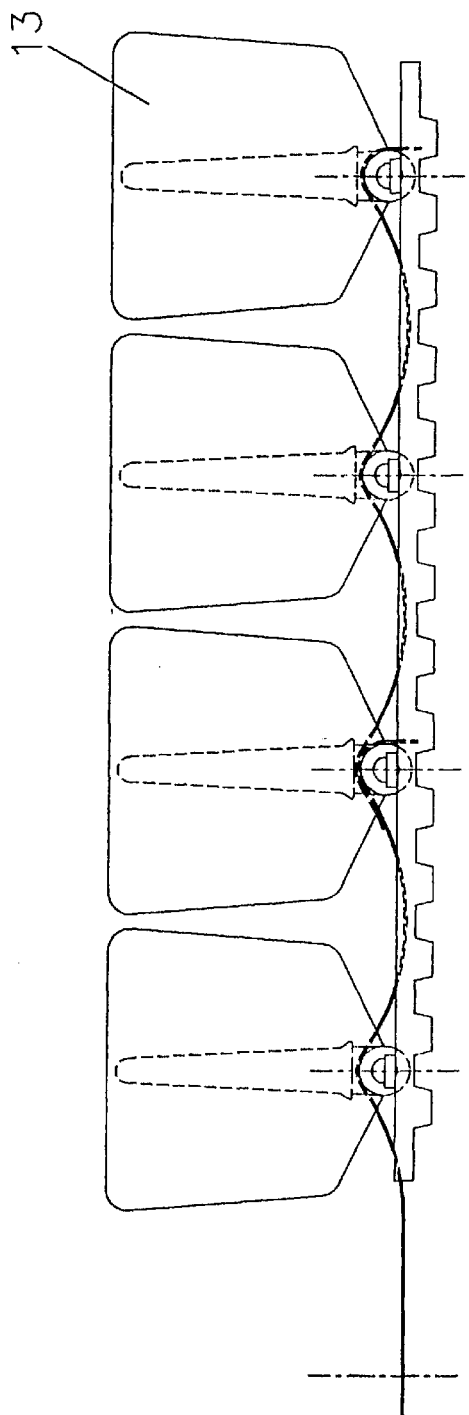
FIG. 7 shows in side view part of an elevator web with retaining side-walls in accordance with the present invention.
Figure 8:
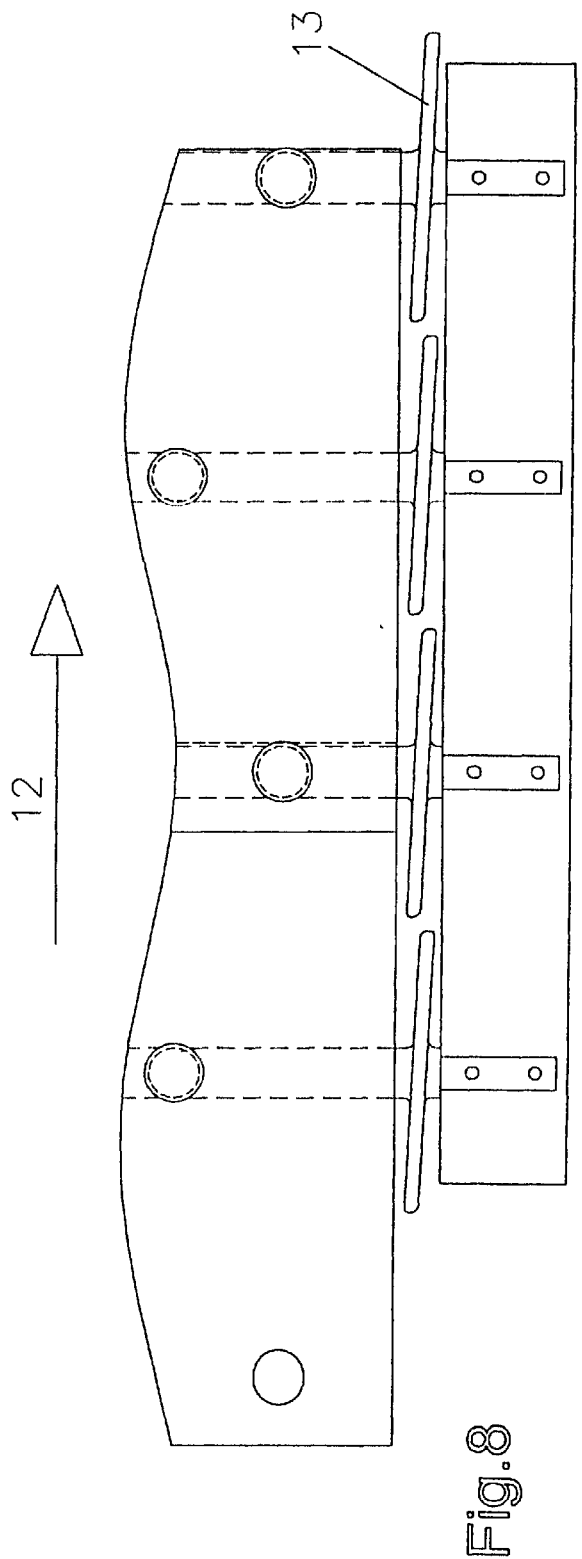
FIG. 8 shows in plan view part of an elevator web of FIG. 7.

In FIGS. 7 and 8 laterally extending projections 13 of the transverse bars form retaining side-walls of the elevator web.

Figure 9:
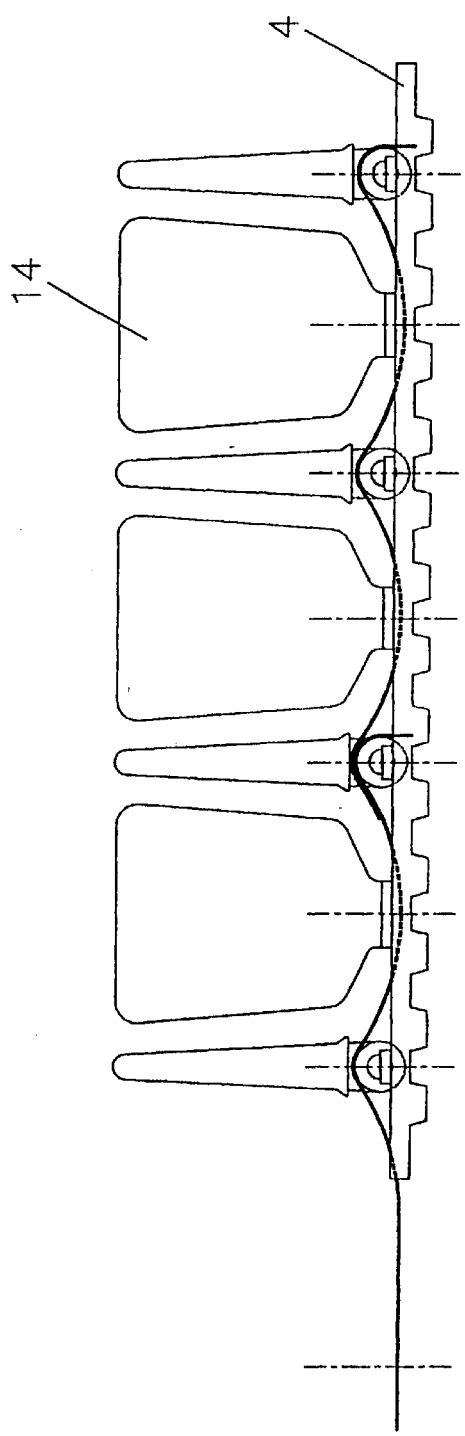
FIG. 9 shows in side view part of an elevator web with additional retaining side-walls in accordance with the present invention.
Figure 10:
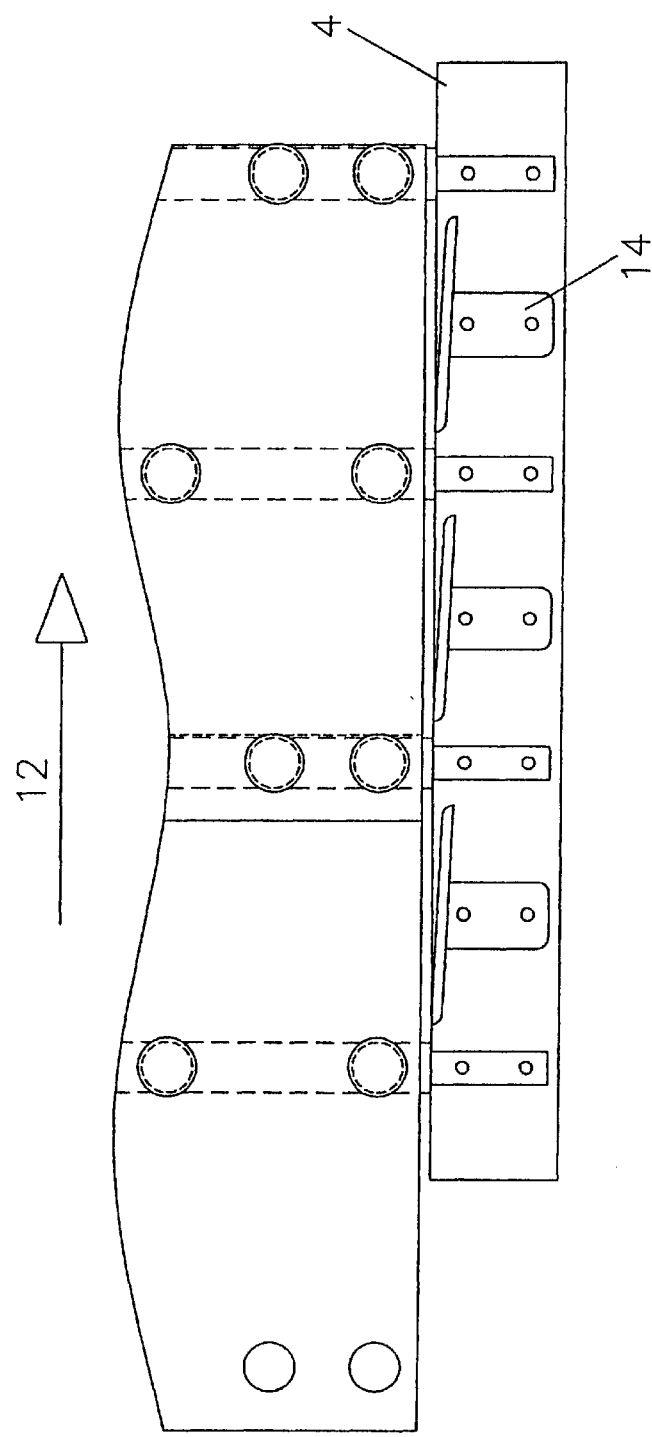
FIG. 10 shows in plan view the part of an elevator web of FIG. 9.

In FIGS. 9 and 10 additional components 14 fitted to the rubber traction belts 4 between the transverse bars form retaining side-walls of the elevator web.

The specification incorporates by reference the disclosure of United Kingdom priority document 0016293.3 of Jul. 4, 2000.

The present invention is, of course, in no way restricted to the specific disclosure of the specification and drawings, but also encompasses any modifications within the scope of the appended claims.

What I claim is:

1. A conveyor/elevator web having rubber traction belts, comprising: a plurality of transverse bars, each of which is connected at ends thereof to said traction belts, wherein each of said transverse bars is provided with a plurality of spaced apart, outwardly extending fingers or projections; and a conveying surface formed by at least one of a flexible sheet and said traction belts, which are provided with spaced apart apertures to correspond with and receive said fingers or projections, wherein components are attached to said rubber traction belts, between said transverse bars, to form retaining sides of a conveyor/elevator surface.

2. A conveyor/elevator web according to claim 1, wherein said outwardly extending fingers or projections of said transverse bars are shaped such as to provide a means of attachment for said at least one of a flexible sheet and said traction belts.

3. A conveyor/elevator web having rubber traction belts, comprising: a plurality of transverse bars, each of which is connected at ends thereof to said traction belts, wherein each of said transverse bars is provided with a plurality of spaced apart, outwardly extending fingers or projections; and a conveying surface formed by at least one of a flexible sheet and said traction belts, which are provided with spaced apart apertures to correspond with and receive said fingers or projections, and said conveying surface is formed by a flexible sheet, wherein said flexible sheet is provided in sections.

4. A conveyor/elevator web according to claim 3, wherein at least some of said outwardly extending fingers or projections of said transverse bars are adapted to entrain material or crop that is being conveyed or elevated.

5. A conveyor/elevator web according to claim 3, wherein said transverse bars are formed of metal or rigid plastic.

6. A conveyor/elevator web according to claim 3, wherein said conveying surface is formed by a flexible sheet, and wherein said transverse bars and said flexible sheet together form pockets to contain material that is being conveyed or elevated.

7. A conveyor/elevator web having rubber traction belts, comprising: a plurality of transverse bars, each of which is connected at ends thereof to said traction belts, wherein each of said transverse bars is provided with a plurality of spaced apart, outwardly extending fingers or projections made of a resiliently deformable material and said transverse bars are provided with a molded covering; and a conveying surface formed by at least one of a flexible sheet and said traction belts, which are provided with spaced apart apertures to correspond with and receive said fingers or projections.

8. A conveyor/elevator web having rubber traction belts, comprising: a plurality of transverse bars, each of which is connected at ends thereof to said traction belts, wherein each of said transverse bars is provided with a plurality of spaced apart, outwardly extending fingers or projections and end regions of said transverse bars are provided with fingers or projections extending laterally from a surface of said transverse bars in order to form retaining sides of a conveying/elevating surface; and a conveying surface formed by at least one of a flexible sheet and said traction belts, which are provided with spaced apart apertures to correspond with and receive said fingers or projections.

* * * * *